(12) United States Patent
Chen et al.

(10) Patent No.: US 8,942,228 B1
(45) Date of Patent: Jan. 27, 2015

(54) SHARED FEATURE CONTROLLER ELECTION IN DISTRIBUTED VOIP ENVIRONMENT

(75) Inventors: Henry Chen, Plano, TX (US); Michael McClung, Advance Mills, VA (US); Haiyun Zhang, Plano, TX (US); Yew Kuan Choo, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1731 days.

(21) Appl. No.: 11/972,827

(22) Filed: Jan. 11, 2008

(51) Int. Cl.
| H04L 12/66 | (2006.01) |
| H04L 12/16 | (2006.01) |
| H04L 29/06 | (2006.01) |
| H04L 12/927 | (2013.01) |
| H04L 12/18 | (2006.01) |
| H04M 3/58 | (2006.01) |
| H04M 3/42 | (2006.01) |
| H04M 3/54 | (2006.01) |
| H04W 8/24 | (2009.01) |
| H04W 4/16 | (2009.01) |

(52) U.S. Cl.
CPC ............ *H04L 29/06* (2013.01); *H04L 65/1069* (2013.01); *H04L 47/806* (2013.01); *H04L 65/1006* (2013.01); *H04L 65/1093* (2013.01); *H04L 12/18* (2013.01); *H04M 3/58* (2013.01); *H04M 3/42* (2013.01); *H04M 3/54* (2013.01); *H04W 8/24* (2013.01); *H04W 4/16* (2013.01)

USPC .......... 370/352; 370/353; 370/354; 370/355; 370/356; 370/260

(58) Field of Classification Search
CPC ....... H04L 12/18; H04L 29/06; H04L 47/806; H04L 65/1006; H04L 65/1069; H04L 65/1093; H04M 3/42; H04M 3/54; H04M 3/58; H04W 4/16; H04W 8/24
USPC ......................................... 370/352–356, 260
See application file for complete search history.

(56) References Cited

U.S. PATENT DOCUMENTS

| 7,215,663 | B1 * | 5/2007 | Radulovic ..................... 370/356 |
| 2001/0005372 | A1 * | 6/2001 | Cave et al. .................... 370/401 |
| 2002/0001302 | A1 * | 1/2002 | Pickett .......................... 370/352 |
| 2005/0163108 | A1 * | 7/2005 | Moore et al. .................. 370/352 |
| 2005/0220079 | A1 * | 10/2005 | Asokan .......................... 370/352 |
| 2006/0146804 | A1 * | 7/2006 | Ozaki ............................ 370/352 |
| 2009/0022145 | A1 * | 1/2009 | Bakshi et al. ................. 370/352 |

* cited by examiner

*Primary Examiner* — Asad Nawaz
*Assistant Examiner* — Kai Chang
(74) *Attorney, Agent, or Firm* — Patent Capital Group

(57) ABSTRACT

In one embodiment, a distributed, dynamic and call based feature controller election is executed in a distributed call processing system which is simple, robust, and consistent. The election is based on which VOIP telephone returns an appropriate SIP message first to a feature controller elector, which may be implemented on a proxy communicating with a wide area network.

14 Claims, 6 Drawing Sheets

SHARED FEATURE CONTROLLER ELECTION IN DISTRIBUTED VOIP ENVIRONMENT

FIELD OF THE INVENTION

The present invention relates generally to electing one of plural VOIP telephones to be a feature controller for a telephone call.

BACKGROUND OF THE INVENTION

The evolution of the public switched telephone network has resulted in a variety of voice applications and services that can be provided to individual subscribers and business subscribers. An open standards-based Internet protocol (IP) network, such as the World Wide Web, the Internet, or a corporate intranet, can provide an alternative typically referred to as "Voice Over IP" (VOIP) that may provide more complex telephony type services involving call control for multiple simultaneous call sessions such as conference bridging, or single number reach (SNR) applications where a calling party attempts to reach a remote telephone using the dialed number (DN) of another telephone (typically an office telephone communicating on a local area network (LAN) with other office telephones).

In particular, a single number reach application provides a calling party an option to either leave a message, or wait while the single number reach application attempts to contact the subscriber at different telephone numbers (e.g., work, cellphone, home, etc.); assuming the single number reach application is able to locate the subscriber, the single number reach application may play an announcement identifying the calling party, allowing the subscriber to either connect with the calling party or send the calling party to the subscriber's voice mailbox. Hence, deployment of a single number reach application requires an architecture that enables call control for multiple simultaneous call sessions.

BRIEF DESCRIPTION OF THE DRAWINGS

The details of non-limiting embodiments of the present invention, both as to its structure and operation, can best be understood in reference to the accompanying drawings, in which like reference numerals refer to like parts, and in which.

DESCRIPTION OF EXAMPLE EMBODIMENTS

Overview

Figure 1:
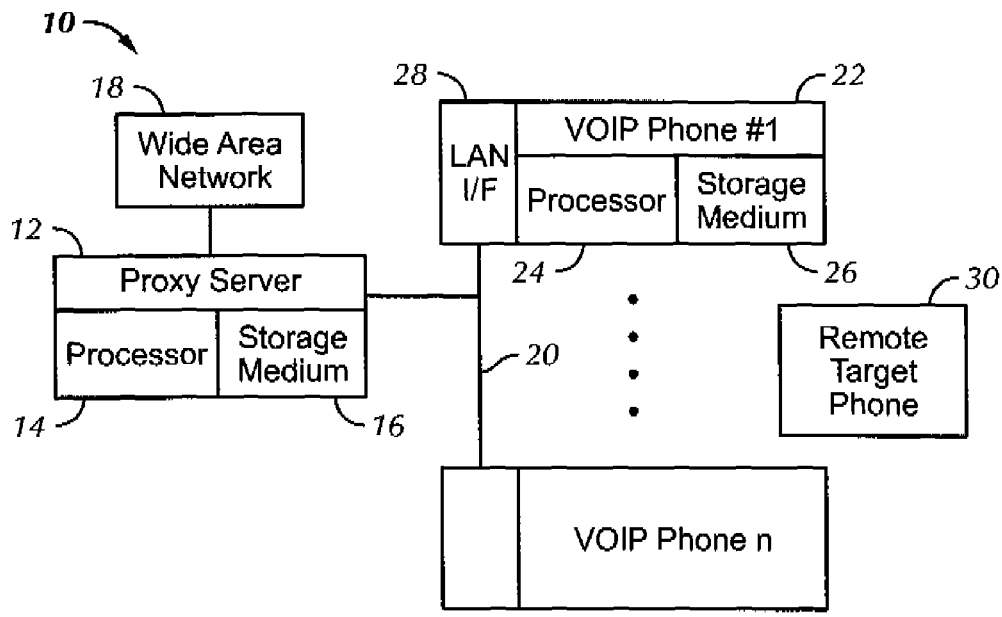
FIG. 1 is a block diagram of an example system.

As critically recognized herein, when a feature such as the SNR feature is enabled for a shared line having more than one telephone, one of the telephones sharing the line advantageously should be designated ("elected") to extend the call on behalf of the shared line to the SNR target so that the call can also be answered by the SNR target. Similarly, the present invention recognizes that features other than SNR advantageously can be controlled by only a single one of the telephones on a shared line. As even further recognized herein, the election of a feature controller preferably should be dynamic for a distributed call processing system and should be simple, robust (meaning it guarantees that the elected controller exists at the time it is elected), and consistent.

Accordingly, a feature controller election is provided that is triggered by messages in a protocol such as SIP that is suitable for distributed call processing across shared lines. For example, an SNR controller election may be triggered by a SIP180 ringing message, whereas a blind transfer controller election may be triggered by SIP 202 message. In any case, the feature controller elector function can be located on a proxy device which monitors SIP messages for a call and elects as controller for the particular feature and call the telephone device whose corresponding SIP message is received by the proxy device first, before messages from the other telephones. The election result may then advantageously be distributed by the elector to the other telephone devices using a multicast SIP notify message. To facilitate this, a multicast group address can be assigned to a shared DN and all of the telephones on the shared DN are made members of the multicast group.

In a first embodiment, an apparatus includes a machine-implemented feature controller elector (FCE) configured for receiving an incoming session initiation protocol (SIP) invitation message directed to a dialed number (DN). The FCE is configured to send the SIP invitation message to plural voice over IP (VOIP) telephones in a distributed communication network and associated with the DN. At least one telephone responds to the SIP invitation message with a SIP response message. The FCE generates an election result designating one and only one of the telephones as being a controller for at least one feature based at least in part on receipt of the SIP response message.

In an example, the election result designates a telephone whose SIP response message is the first SIP response message received by the FCE in response to the SIP invitation message.

In an example, the FCE can be implemented on a proxy server communicating with the telephones and with a wide area network (WAN).

The feature may be single number reach (SNR) in which case the SIP response message is a SIP 180 message. Or, the feature can be blind transfer to a target telephone in which case the SIP response message can be a SIP 202 message. Yet again, the feature can be providing a busy lamp field (BLF) indication.

In another embodiment an apparatus includes means for receiving an incoming telephone call from a public telephony network, and means for providing notice of the call to plural VOIP-enabled telephones sharing a common line or network address. Means are provided for electing, as a feature controller for the call, the VOIP-enabled telephone that first returns a predetermined message in response to the notice of the call, such that telephones that subsequently return the predetermined message in response to the notice of the call are not elected feature controller for the call.

In another embodiment, a method includes receiving an invitation for a voice call from a telephony network. The method also includes notifying plural VOIP telephones in a distributed network sharing a dialed number (DN) of the invitation. Response messages are received from the telephones in reply and the telephone associated with a first-received response message is elected as a controller for a feature associated with the call.

DESCRIPTION OF EXAMPLE INVENTIONS

Referring initially to FIG. 1, a system is shown, generally designated 10, which can include one or more proxy servers 12 (only one proxy shown) with an associated processor 14 and tangible electronic storage medium 16. The proxy 12 can communicate with a wide area network (WAN) 18. The WAN 18 may be the Internet and/or the public switched telephone network (PSTN).

The proxy 12 can also communicate with a local area network (LAN) 20 which establishes a distributed call system having plural voice over internet protocol (VOIP) telephones 22. Each VOIP telephone 22 can have a respective telephone processor 24 and tangible electronic storage medium 26, and can communicate with the LAN 20 using a LAN interface 28. As set forth further below, one or more remote target telephones 30 may receive calls relayed from a VOIP telephone 22, although the target telephone 30 itself is not part of the LAN 20.

The logic shown in the figures and described further below without limitation may be executed by any one of or combination of the processors discussed above. Typically, each processor can access logic stored on its associated tangible electronic storage medium such as disk storage, solid state storage, or other type of electronic storage.

Figure 2:
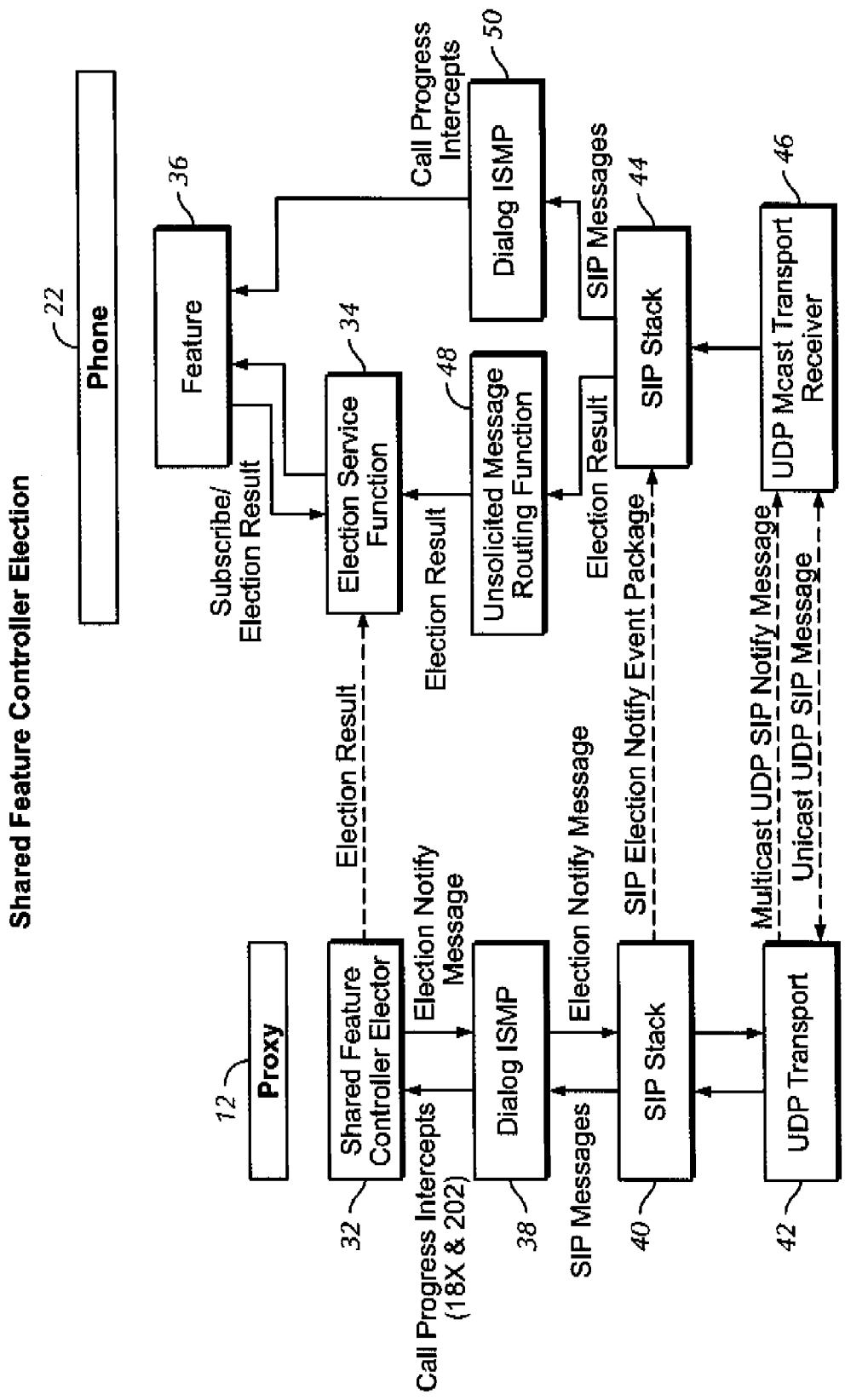
FIG. 2 is a block diagram of an example non-limiting system architecture.

FIG. 2 illustrates an example architecture (which may be software modules implemented in hardware) with which present principles may be used. A shared feature controller elector 32, which can be embodied by any suitable processor to undertake the election functions discussed herein, makes elections in accordance with principles below and sends the results to an election service function 34 of an elected telephone 22. The elector 32 may be implemented by the proxy 12 as shown or it may be implemented in a peer telephone of a peer-to-peer system. In any case, the election service function 34 controls, on behalf of its telephone 22, a feature 36.

In non-limiting implementations in which the elector 32 is implemented by the proxy 12, the elector 32 sends election notification messages to a dialog Internet-enabled state machine process (ISMP) 38, which in turn relays the messages to a Session Initiation Protocol (SIP) stack 40. The SIP stack 40 communicates with a User Datagram Protocol (UDP) transport element 42 and also returns certain SIP messages, such as call progress messages including SIP 180 ("phone ringing" message) and SIP 202 ("call transfer accepted") messages, to the elector 32 for purposes to be shortly disclosed. Like the elector 32, the dialog ISMP 38, SIP stack 40, and UDP transport element 42 may be implemented on the proxy 12.

As shown in FIG. 2, the SIP stack 40 of the proxy 12 can send SIP election notify event packages to a SIP stack 44 of the telephone 22. Also, the UDP transport element 42 of the proxy 12 can send multicast UDP SIP notify messages to a UDP multicast transport receiver 46 of the telephone 22, which communicates with the SIP stack 44 of the telephone 22 as shown. Further, the UDP multicast transport receiver 46 of the telephone 22 can return unicast UDP SIP messages to the UDP transport element 42 of the proxy 12, such that it may now be understood that the above-mentioned call progress intercept messages may be received by the elector 32 from the UDP multicast transport receiver 46.

Still referring to FIG. 2, the SIP stack 44 of the telephone 22 sends election notify messages to an unsolicited message routing function 48, which conveys an election result to the election service function 34. Also, the SIP stack 44 of the telephone 22 sends SIP messages to a dialog ISMP module 50 of the telephone 22, which in turn conveys call progress intercept messages to the feature 36 of the telephone 22 as shown.

Figure 3:
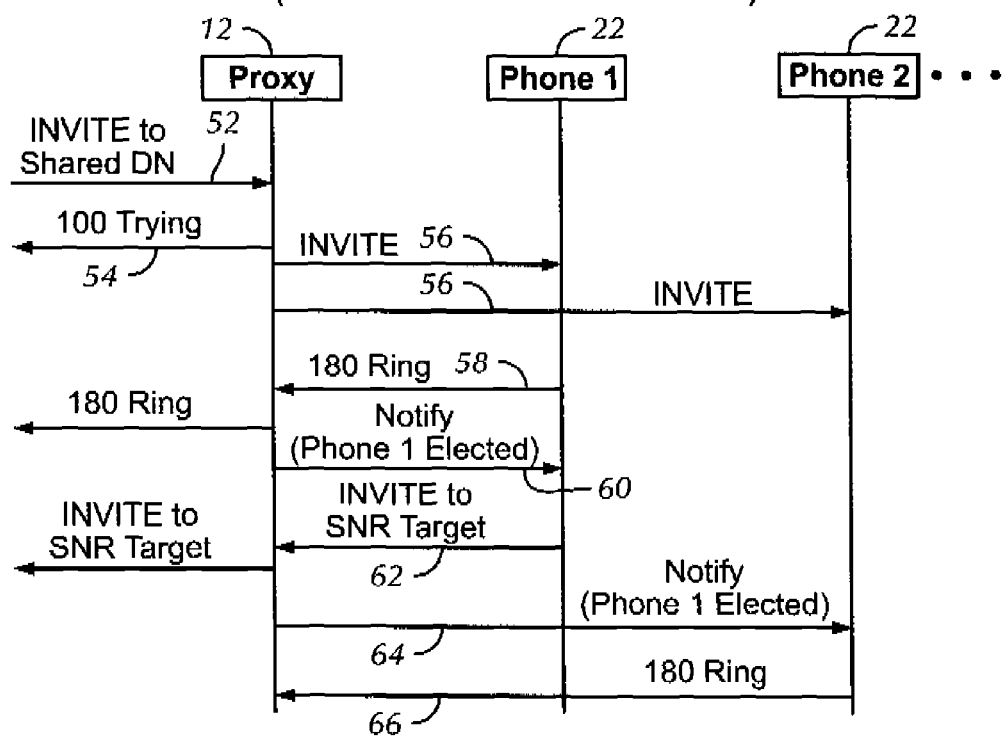
FIG. 3 is a message flow diagram illustrating an example election call flow for electing a single number reach (SNR) controller.

FIG. 3 shows logic that can be implemented using the architecture of FIG. 2. The temporal sequence of events flows from top to bottom of the figure. In FIG. 3, the notation used for the telephone that will be elected as described is "phone 1", and "phone 2" represents non-elected telephones on the LAN 20 shown in FIG. 1. The particular feature for which election is made in FIG. 3 is Single Number Reach (SNR), wherein it is assumed that a user has indicated that an off-net remote target telephone is to receive calls directed to a shared dialed number (DN) (i.e., the common number shared by telephones 22 on the LAN 20) even though the remote target telephone has a different telephone number.

With particular respect to the SNR feature, an incoming VOIP call from the public network when formatted for SIP communication is referred to herein as a SIP INVITE message. When a SIP invite reaches the proxy, the proxy routes the call to an associated SIP-enabled telephone that is registered with a uniform resource locator (URL) to which the call has been placed. The SIP telephone further processes the call (i.e., the SIP invite message) and sends a SIP "ringing" message back to the caller. The SIP telephone then starts ringing. If SNR is enabled on the SIP telephone, the SIP telephone will also make another call to a SNR target (by, e.g., sending another SIP INVITE message to the SNR target, which is usually a remote telephone) automatically. The original incoming call can be answered by either the SIP telephone or the remote SNR target telephone.

If the line represented by the URL is shared by several SIP telephones, the SIP invite message can be forked by the proxy to all of the telephones sharing the line. All of the telephones will process the SIP invite message and start ringing. The call can be answered by any of these telephones.

With this in mind, an incoming telephone call represented by an invitation 52 to a shared dialed number (DN) (i.e., the telephones 22 on the LAN 20 share a common number) is received by the proxy 12. In response, the proxy 12 may immediately return to the calling party a SIP 100 message 54 indicating that connection is being attempted.

The proxy 12 sends invite messages 56 to the telephones 22 on the LAN 20. In the example of FIG. 3, telephone 1 is the first to return a predetermined SIP message 58, in this case, a SIP 180 ("phone ringing") message, which can be relayed by the proxy to the calling party as shown.

In response to the first-received predetermined message, the elector 32 shown in FIG. 2 elects the originator of the first-received SIP message as the elector, and sends a notification message 60 of such to the elected telephone. Because the example feature of interest in FIG. 3 is SNR, the elected telephone 1 returns to the proxy 12 an SIP invite message 62, which the proxy 12 relays to the calling party as shown. The SNR feature 36 of the elected controller telephone (in this case, telephone 1) then controls, to the exclusion of non-elected telephones 22 on the LAN 20, the SNR feature for the call, for example, sending signals to the remote target telephone 30 as appropriate.

As also shown in FIG. 3, once the proxy 12 makes the election of telephone 1 as feature controller, it sends a notification message 64 of such to the non-elected telephones. Even if a non-elected telephone should return to the proxy 12 the predetermined message 66 (in this case, SIP 180 "ring" message), the election of the first-responding telephone (phone 1 in FIG. 3) remains in effect for the particular feature (in this case, the SNR feature) for the duration of the call.

Figure 4:
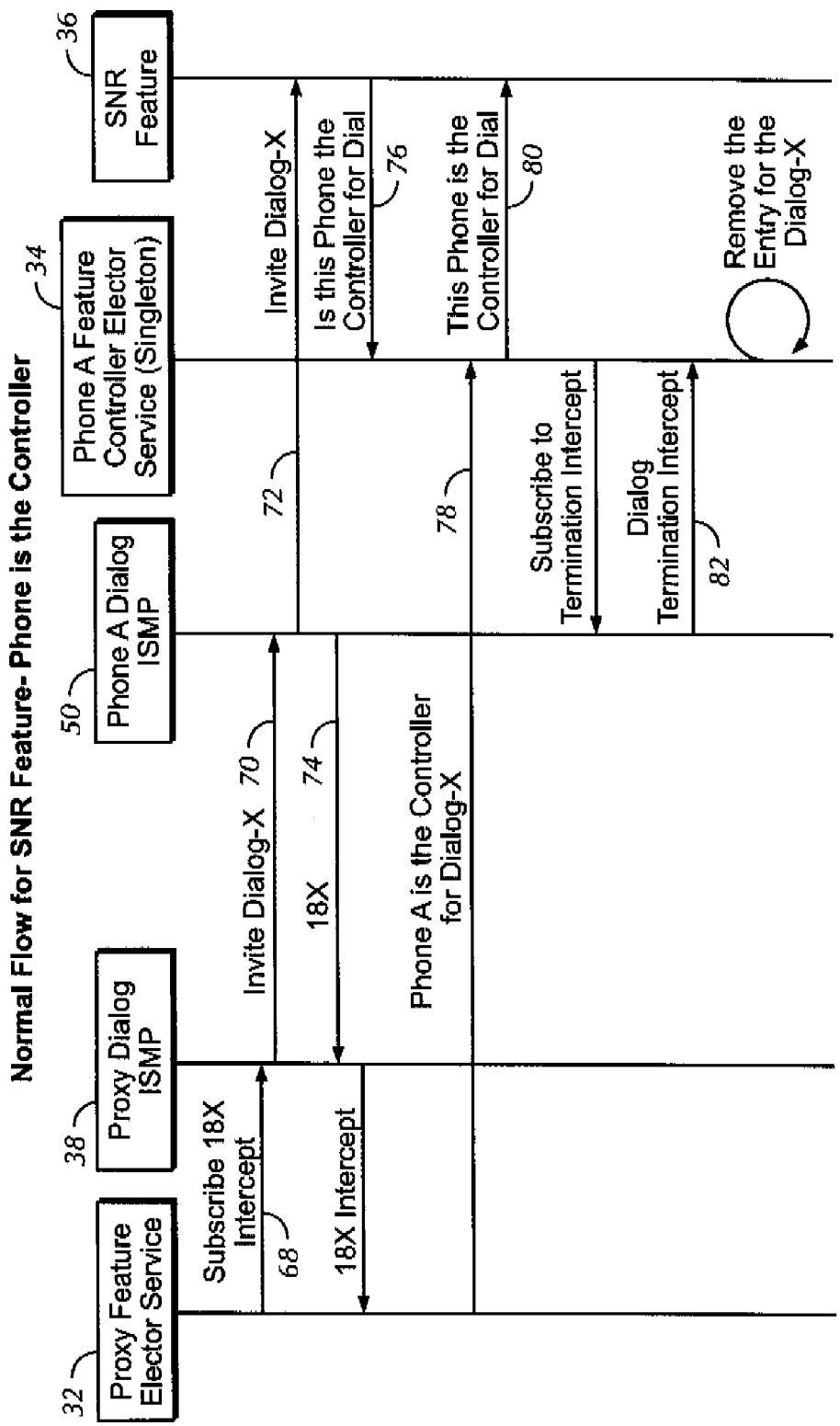
FIG. 4 is a more detailed message flow diagram illustrating an example election call flow in the case of a telephone elected to be SNR feature controller.
Figure 5:
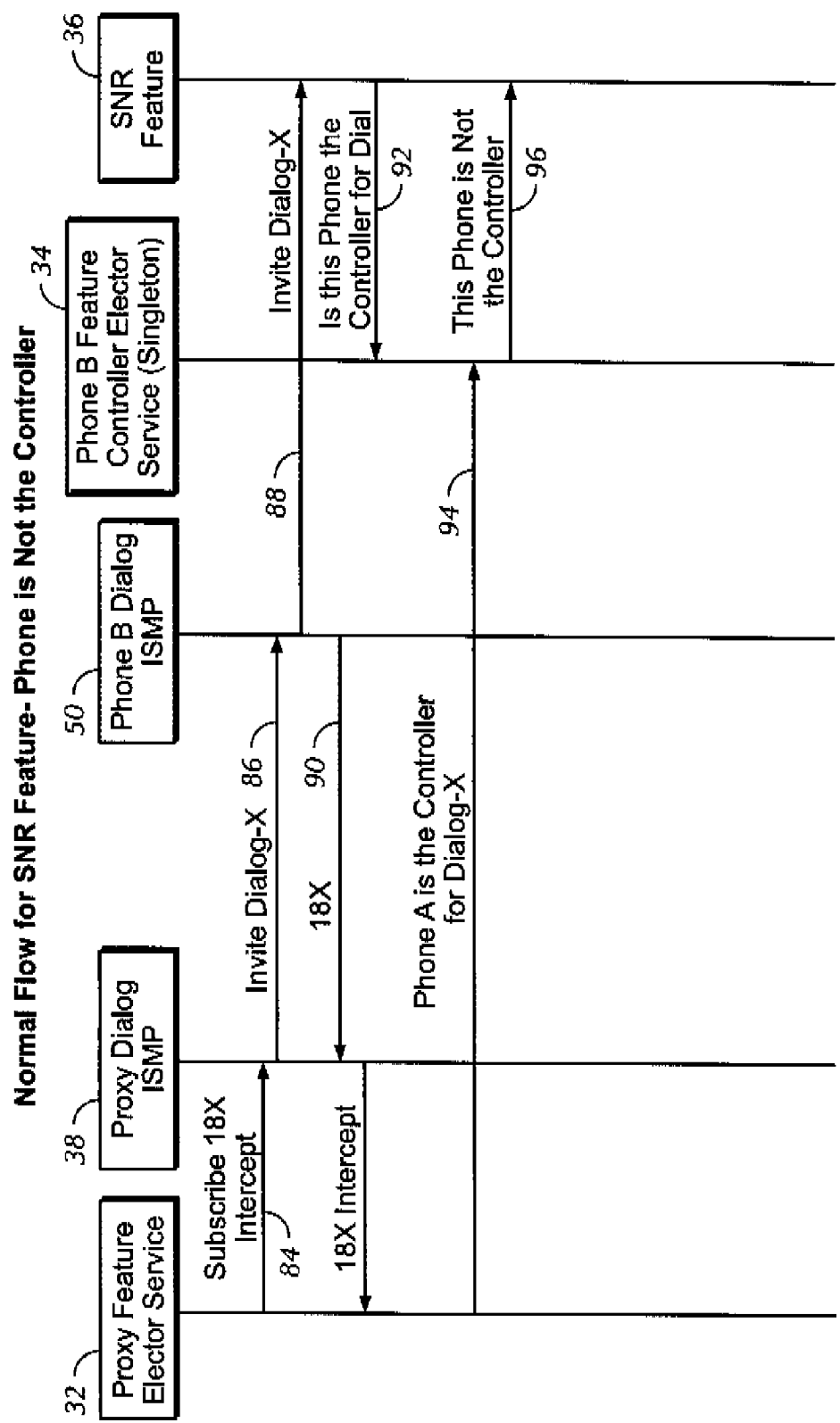
FIGS. 5 and 6 are message flow diagrams illustrating example election call flows in the case of telephones that are not elected to be SNR feature controller.
Figure 6:
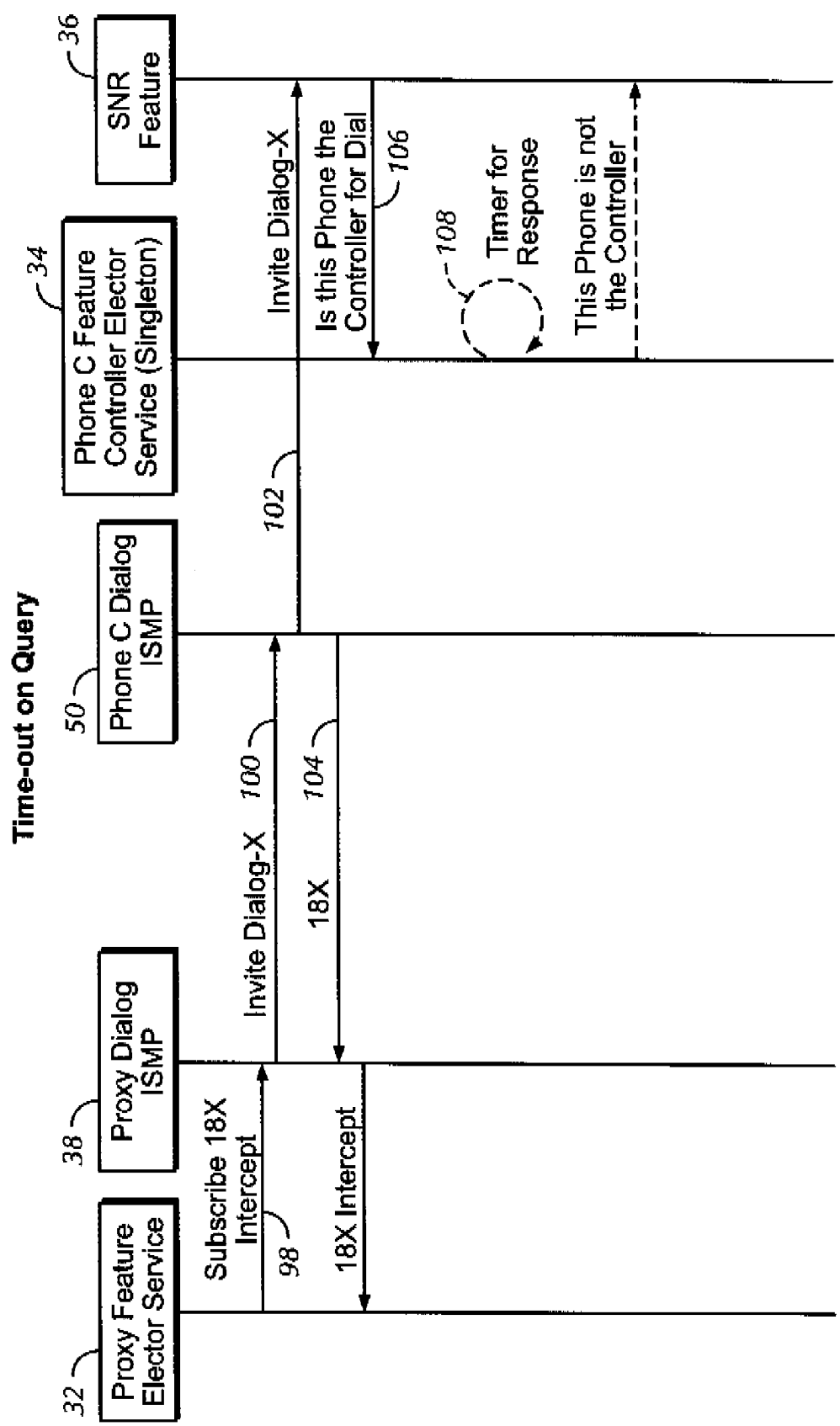

FIGS. 4-6 show additional details of the example SNR feature election of FIG. 3, in terms of specific architecture of FIG. 2. FIG. 4 shows the message flow in the case of the elected telephone (phone 1 in FIG. 3). The elector 32 of the proxy 12 sends a subscribe 18x intercept message 68 to the proxy's dialog ISMP 38, which in turn sends an invite dialog message 70 to the dialog ISMP 50 of the telephone, it being understood that these messages may pass through the various components such as UDP components shown in FIG. 2 as appropriate. The dialog ISMP 50 of the telephone relays at 72 the invite dialog message to the telephone's SNR feature 36. Then, the ISMP 50 sends the predetermined SIP message 74 (in the case of SNR, the SIP 180 "ringing" message) to the elector 32 through the dialog ISMP 38 of the proxy as shown.

The SNR feature 36 of the telephone queries at 76 the telephone's elector service 34 whether it is to control the SNR feature for the current call. When the proxy's elector 32 sends the above-discussed "elected" message 78 to the telephone's elector service 34, the service 34 informs (at 80) the SNR feature 36 that it is to control the feature for the call. Appropriate call termination intercept messages 82 may be exchanged as shown when the call ends.

In a non-limiting example the election notify message 78 includes the shared DN ID, the elected telephone ID, and the call ID for the election service function to determine which telephone is elected for which call and for which shared DN. The message 76 sent from the feature 36 to the election service function 34 can also include call ID and shared DN ID to enable the service function 34 to match an election result to an election service subscription.

FIG. 5 shows the message flow in the case of a non-elected telephone (phone 2 in FIG. 3). The elector 32 of the proxy 12 sends a subscribe 18x intercept message 84 to the proxy's dialog ISMP 38, which in turn sends an invite dialog message 86 to the dialog ISMP 50 of the telephone. The dialog ISMP 50 of the telephone relays at 88 the invite dialog message to the telephone's SNR feature 36. Then, the ISMP 50 sends the predetermined SIP message 90 (in the case of SNR, the SIP 180 "ringing" message) to the elector 32 through the dialog ISMP 38 of the proxy as shown.

The SNR feature 36 of the telephone queries at 92 the telephone's elector service 34 whether it is to control the SNR feature for the current call. When the proxy's elector 32 sends to telephone 2 (and other non-elected telephones) a "phone 1 is elected" (multicast) message 94 to the telephone's elector service 34, the service 34 informs (at 96) the SNR feature 36 that it is not to control the feature for the call.

FIG. 6 shows a non-elected telephone message flow similar to FIG. 5 but in the case wherein a time-out might occur. The elector 32 of the proxy 12 sends a subscribe 18x intercept message 98 to the proxy's dialog ISMP 38, which in turn sends an invite dialog message 100 to the dialog ISMP 50 of the telephone. The dialog ISMP 50 of the telephone relays at 102 the invite dialog message to the telephone's SNR feature 36. Then, the ISMP 50 sends the predetermined SIP message 104 (in the case of SNR, the SIP 180 "ringing" message) to the elector 32 through the dialog ISMP 38 of the proxy as shown.

The SNR feature 36 of the telephone queries at 106 the telephone's elector service 34 whether it is to control the SNR feature for the current call. As indicated at 108, if a time period for response elapses the feature 36 assumes it has not been elected feature controller for the call.

Figure 7:
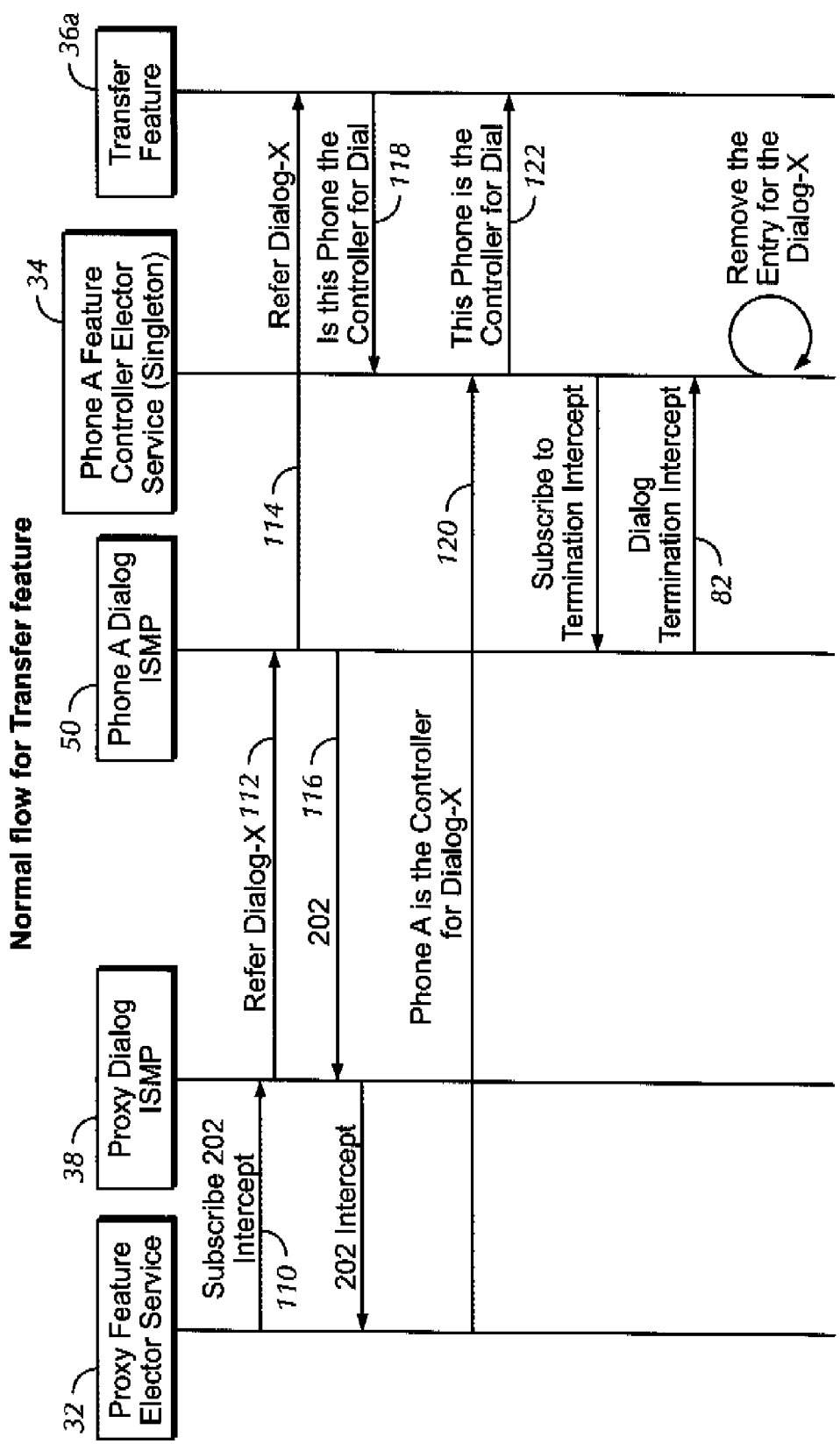
FIG. 7 is a message flow diagram illustrating an example election call flow for electing a blind transfer feature controller.

FIG. 7 shows that present principles may be extended to features other than SNR, e.g., to blind call transfer and specifically to determining which telephone 22 will play the ring-back tone to the forward telephone. FIG. 7 shows the message flow for blind call transfer feature control in the case of the elected telephone (phone 1 in FIG. 3). The elector 32 of the proxy 12 sends a subscribe 202 intercept message 110 to the proxy's dialog ISMP 38, which in turn sends a refer dialog message 112 to the dialog ISMP 50 of the telephone. The dialog ISMP 50 of the telephone relays at 114 the refer dialog message to the telephone's (transfer) feature, labelled "36a" to avoid confusion with the SNR feature 36 discussed above. Then, the ISMP 50 sends the predetermined SIP message 116 (in the case of SNR, the SIP 202 message) to the elector 32 through the dialog ISMP 38 of the proxy as shown.

The transfer feature 36a of the telephone queries at 118 the telephone's elector service 34 whether it is to control the blind call transfer feature for the current call. When the proxy's elector 32 sends the above-discussed "elected" message 120 to the telephone's elector service 34, the service 34 informs (at 122) the feature 36a that it is to control the feature for the call. Appropriate call termination intercept messages 82 may be exchanged as shown when the call ends.

In addition to SNR and blind call transfer, the above first-to-acknowledge election process can be used to elect a telephone 22 on the LAN 20 for other features, including but not limited to which telephone 22 should control Busy Lamp Field (BLF) indication (an indicator that displays busy or idle status of other telephones on the LAN 20). In one non-limiting example a telephone 22 is elected to indicate the incoming call ring state of the telephones on the LAN 20.

While the above elector is call-based, it may also be device-based or line-based. With the above logic, the elector 32 advantageously can always locate a telephone 22 to be feature controller.

While the particular SHARED FEATURE CONTROLLER ELECTION IN DISTRIBUTED VOIP ENVIRONMENT is herein shown and described in detail, it is to be understood that the subject matter which is encompassed by the present invention is limited only by the claims.

What is claimed is:

1. An apparatus comprising:
a feature controller elector (FCE) configured for receiving an invitation message directed to a dialed number (DN), the FCE configured to send the invitation message to a plurality of telephones on a shared line in a distributed communication network and associated with the DN, at least one VOIP telephone responding to the invitation message with a response message;
wherein the telephones are voice over IP (VOIP) telephones; and
wherein the FCE generates an election result designating one and only one of the telephones as being a controller for at least one feature based at least in part on receipt of the response message, wherein the election result designates the one and only one of the telephones whose response message is the first response message received by the FCE in response to the invitation message and wherein telephones that subsequently return the response message are not designated as controller for the at least one feature, wherein the FCE sends a notification of the election result to each of the plurality of telephones, wherein the notification includes an identifier of the telephone elected as the controller for the at least one feature, wherein the notification is sent to the non-elected telephones using a multicast message having a multicast address assigned to the dialed number, and wherein the at least one feature is blind transfer to a target telephone and the response message is a SIP 202 message.

2. The apparatus of claim 1, wherein the FCE is implemented on a proxy server communicating with the telephones and with a wide area network (WAN).

3. The apparatus of claim 1, wherein the feature is single number reach (SNR) and the response message is a SIP 180 message.

4. The apparatus of claim 1, wherein the feature is providing a busy lamp field (BLF) indication.

5. An apparatus comprising:
   means for receiving an incoming telephone call from a public telephony network;
   means for providing notice of the call to plural VOIP-enabled telephones sharing a common line or network address; means for electing, as a feature controller for the call, the VOIP-enabled telephone that first returns a predetermined message in response to the notice of the call, wherein VOIP-enabled telephones that subsequently return the predetermined message in response to the notice of the call are not elected feature controller for the call; and
   means for sending a notification of the election result to each of the VOIP-enabled telephones, wherein the notification includes an identifier of the VOIP-enabled telephone elected as the controller for the call, wherein the notification is sent to the non-elected VOIP-enabled telephone using a multicast message having a multicast address assigned to a dialed number associated with the call and wherein a feature controlled by the feature controller is blind transfer to a target telephone and the predetermined message is a SIP 202 message.

6. The apparatus of claim 5, wherein the means for receiving, means for providing, and means for electing are implemented on a proxy server communicating with the VOIP-enabled telephones and with a wide area network (WAN).

7. The apparatus of claim 5, wherein a feature controlled by the feature controller is single number reach (SNR) and the predetermined message is a SIP 180 message.

8. The apparatus of claim 5, wherein a feature controlled by the feature controller is providing a busy lamp field (BLF) indication.

9. A method comprising:
   receiving an invitation for a voice call from a telephony network;
   notifying plural VOIP telephones on a shared line in a distributed network;
   receiving response messages from the VOIP telephones;
   electing as a controller for at least one feature associated with the call the VOIP telephone associated with a first-received response message, wherein VOIP telephones that subsequently return the response message are not designated as the controller for the at least one feature; and
   sending a notification of the election result to each of the VOIP telephones, wherein the notification includes an identifier of the VOIP telephone elected as the controller for the at least one feature, wherein the notification is sent to the non-elected VOIP-telephone using a multicast message having a multicast address assigned to a dialed number associated with the call, and wherein a feature controlled by the controller is blind transfer to a target telephone and the response messages are SIP 202 messages.

10. The method of claim 9, further comprising notifying the VOIP telephones of the election of the controller.

11. The method of claim 9, comprising executing the receiving, notifying, and electing acts on a proxy server communicating with the VOIP telephones and with a wide area network (WAN).

12. The method of claim 9, wherein a feature controlled by the controller is single number reach (SNR) and the response messages are SIP 180 messages.

13. The method of claim 9, wherein a feature controlled by the controller is providing a busy lamp field (BLF) indication.

14. The method of claim 9, comprising notifying all VOIP telephones in the distributed network.

* * * * *